Feb. 25, 1964 L. P. ZIMMERMAN ETAL 3,122,179

TRANSISTOR HANDLING APPARATUS

Filed Dec. 6, 1961 7 Sheets-Sheet 1

INVENTORS
LOUIS P. ZIMMERMAN
BY ALBERT W. ZEMEK

Franklin D. Wolffe
ATTORNEY

TRANSISTOR HANDLING APPARATUS

Filed Dec. 6, 1961 7 Sheets-Sheet 2

INVENTORS
LOUIS P. ZIMMERMAN
ALBERT W. ZEMEK
BY Franklin D. Wolffe
ATTORNEY

TRANSISTOR HANDLING APPARATUS

Filed Dec. 6, 1961 7 Sheets-Sheet 3

INVENTORS
LOUIS P. ZIMMERMAN
BY ALBERT W. ZEMEK
Franklin D. Wolffe
ATTORNEY

TRANSISTOR HANDLING APPARATUS

Filed Dec. 6, 1961 7 Sheets-Sheet 4

*INVENTORS*
LOUIS P. ZIMMERMAN
ALBERT W. ZEMEK
*BY* Franklin D. Wolffe
*ATTORNEY*

INVENTORS
LOUIS P. ZIMMERMAN
BY ALBERT W. ZEMEK
Franklin D. Wolffe
ATTORNEY

INVENTORS
LOUIS P. ZIMMERMAN
ALBERT W. ZEMEK
BY
Franklin D. Wolffe
ATTORNEY

TRANSISTOR HANDLING APPARATUS

Filed Dec. 6, 1961 7 Sheets-Sheet 7

*INVENTORS*
LOUIS P. ZIMMERMAN
ALBERT W. ZEMEK

*BY* Franklin D. Wolffe
*ATTORNEY*

United States Patent Office 3,122,179 Patented Feb. 25, 1964

3,122,179
TRANSISTOR HANDLING APPARATUS

Louis P. Zimmerman and Albert W. Zemek, both of Binghamton, N.Y., assignors to Universal Instruments Corporation, Binghamton, N.Y., a corporation of New York Filed Dec. 6, 1961, Ser. No. 157,432
14 Claims. (Cl. 140—147)

The present invention relates to apparatus for handling transistors, or similar electrical components having leads extending from the body thereof, and more particularly to apparatus for combining the leads and then feeding the transistor to a receiving member. The receiving member disclosed is a lead straightener, there being a guide to guide the leads to the straightener.

Apparatus heretofore developed for the handling of the leads of a large number of electrical components has generally been in the field of electric lamps and so-called vacuum tubes. Generally, the known apparatus is either partially hand-operated, making it necessarily slow, or is specifically adapted to the particular items noted. In either case, the known apparatus is unsuitable to the rapid and automatic production of transistors, wherein special requirements and configurations are met.

An object of the present invention is to provide apparatus to enable the rapid and automatic combing and straightening of transistor leads, or the like.

Another object of the present invention is the provision of an apparatus for combing the leads of a transistor or the like.

Yet another object of the present invention is to provide a lead comber which will securely hold the transistor during both lead combing and later feeding of the transistor.

A further object of the present invention is the provision of a supplementary guide for the leads of a transistor during feeding of the transistor.

A still further object of the present invention is to provide a guide for the leads of a transistor; a guide which will positively receive and guide the leads; and a guide which may be removed from the path of the transistor body during feeding advance thereof.

Another object of the present invention is the provision of an apparatus capable of realizing the above objects and which will be reliable and dependable in operation.

Other objects and many of the attendant advantages of the present invention will be apparent from the following description and drawings, wherein.

*General Description*

Figure 1:
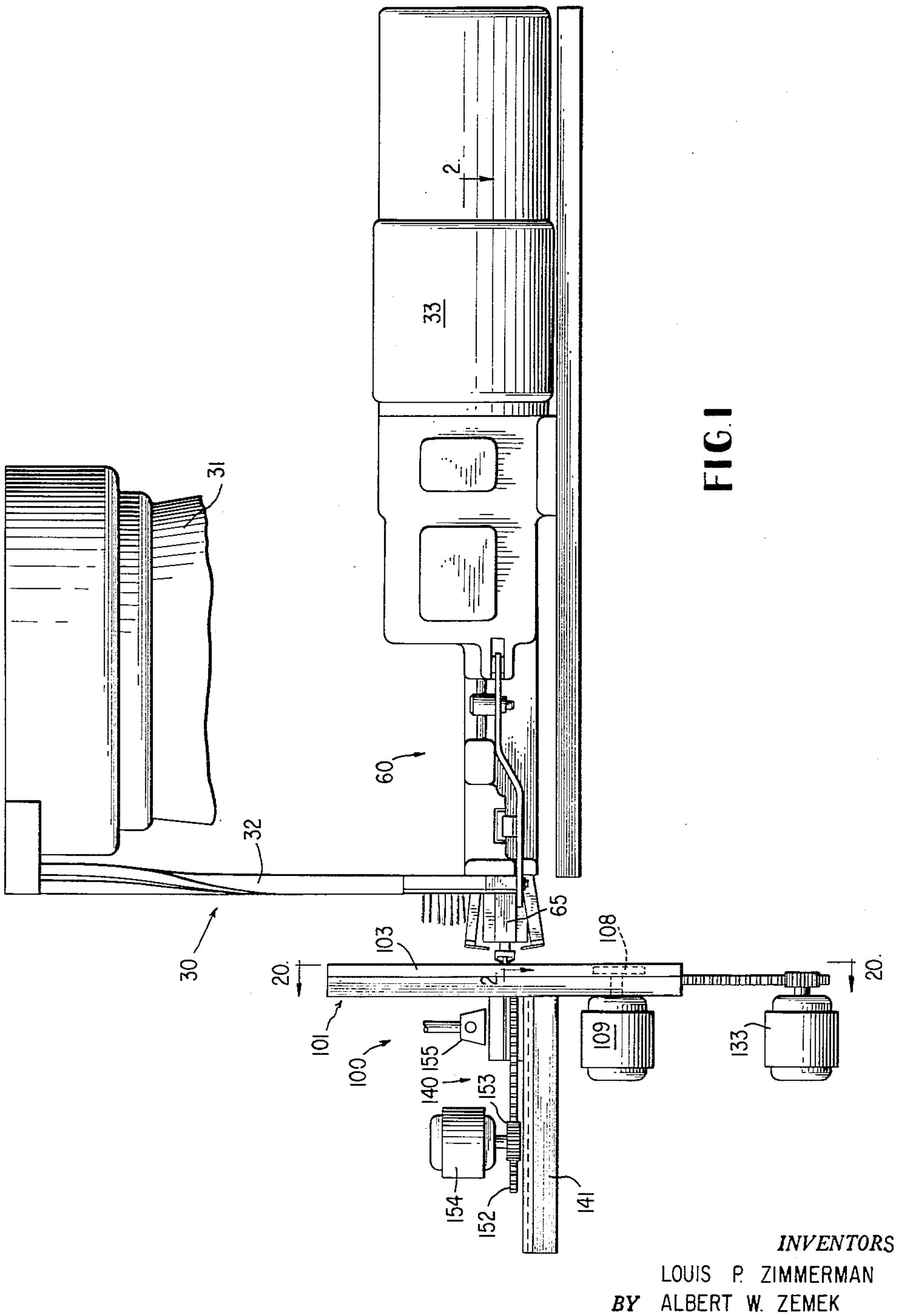
FIG. 1 is an elevational view of a transistor lead comber and straightener in accordance with the present invention.

In accordance with the present invention, transistors or similar elements having a head or body portion and three extending leads or lead wires are placed in a predetermined orientation in a chute, with the leads extending in generally the same direction, the leads being somewhat bent and crooked. From the chute, a feeder mechanism feeds the transistors one at a time into a nest, which is at the front end of a feed bolt. A retainer arm serves to keep the transistor head seated in the nest, and a pair of comb elements, carried by a pair of comb arms, are caused to close and to thereby grip the extending leads. These comb elements grip the leads closely adjacent the transistor head and then move away from the transistor head so as to comb or separate the leads. These comb elements travel approximately to the free ends of the leads, and during this motion, which is relatively rapid, the feed bolt begins to move in the same direction, carrying the nest and the transistor head with it. The transistor leads are thereby inserted into holes in a guide device, designated an iris guide, and the comb arms then separate to permit the transistor head and the nest to move through the plane formerly occupied by the comb elements. The leads being pushed generally axially through the holes in the iris guide enter appropriate openings in a set of die blocks, which openings are in registry with the openings or holes in the iris guide. The feed bolt continues its movement, pushing the transistor head not only through the plane formerly occupied by the comb elements, but also through the plane formerly occupied by the iris guide element, which has been retracted prior to the transistor head reaching the plane thereof. The retainer arm having previously been moved to a withdrawn position, an ejector pin pushes from within the feed bolt against the transistor head to give it its final movement towards the die blocks. The feed bolt and comb carriage and related mechanisms are then retracted to an initial position.

When the leads of the transistor are in the die block, a pressure is exerted on one of the die blocks to effect a straightening of the leads. A receiver chute, synchronized with the iris guide mechanism rises to receive the head of the transistor, and the die blocks are then moved axially away from the transistor head, to thereby release the leads, permitting the transistor to pass by gravity through the receiver chute.

In order to achieve additional guidance, a supplementary guide may be provided to guide the leads after they are no longer supported by the comb elements. The supplementary guide comprises a pair of grooved guide blocks which receive the leads as the nest moves forwardly and guides them until they are moved from out of the path of the nest and transistor head as these elements approach.

*Main Drive and Supply Mechanism*

A large number of transistors T are placed in a supply container 30, which is comprised of a vibrating bowl feed device 31 and a chute 32. The vibrating bowl feeder 31 causes the transistors to pass into a chute 32 in a predetermined orientation, and the leads of a number of transistors may be seen extending from the chute 32 in FIG. 1.

Figures 2, 3:
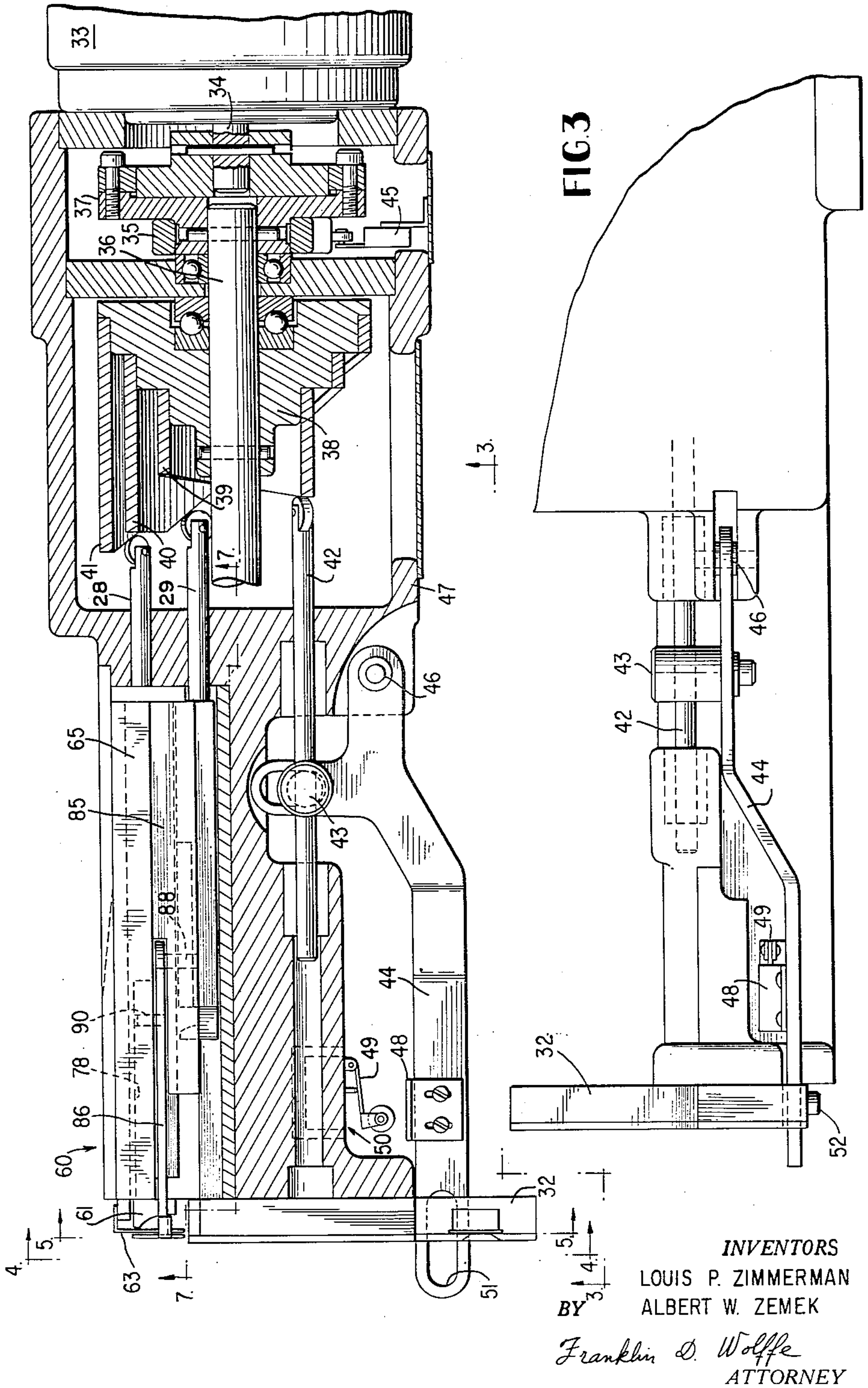
FIG. 2 is a cross-sectional view taken on the line 2—2 of FIG. 1.
FIG. 3 is an elevational view taken on the line 3—3 of FIG. 2.

A main drive motor 33 is provided, this being a synchronous motor in its preferred form. Referring to FIG. 2, a shaft 34 of motor 33 drives a main shaft 36 through a slip clutch 37. Shaft 36 carries a one lobe cam 35 which operates switch 45. On shaft 36 also is a support 38 which mounts three cylindrical cams 39, 40 and 41.

A cam follower 42 is reciprocated by cam 39, and is connected at 43 to a feed lever 44. Feed lever 44 is pivoted at 46 to the housing 47 for the cylindrical cam. Adjacent to but spaced from the forward end of lever 44, there is mounted an abutment plate 48 which causes an arm 49 of a switch 50 to move to close the switch 50 when the lever 44 is in its inner position.

Figure 4:
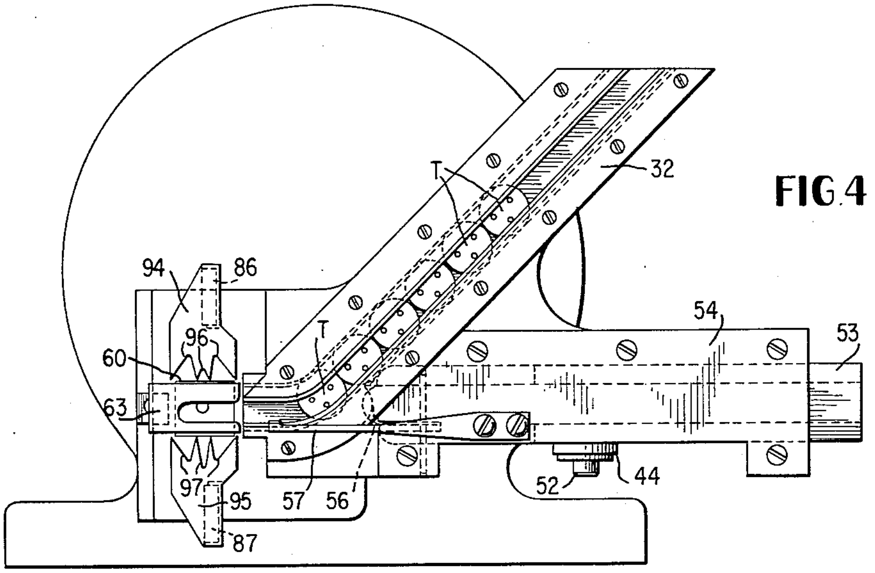
FIG. 4 is an elevational view taken on the line 4—4 of FIG. 2.
Figure 5:
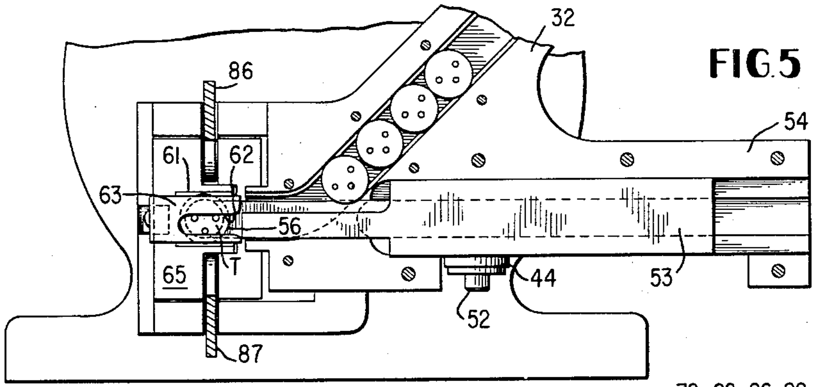
FIG. 5 is a cross-sectional view taken on the line 5—5 of FIG. 2.

The forward end of lever 44 is slotted at 51, the slot receiving the pin 52 shown in FIGS. 3, 4 and 5. Pin 52 depends from a pusher bar 53 which is guided in a housing 54 (FIG. 4). An end of pusher bar 53 is of generally arcuate formation, as at 56. Mounted on the housing 54 is a spring keeper 57.

In FIG. 4, the pusher bar 53 is shown approaching the lowermost transistor T held in the chute 32 and kept in position by the keeper 57. In FIG. 5, the pusher bar 53 has pushed the lowermost transistor out of the end of chute 32, overcoming the force of spring keeper 57, and has inserted the head of the transistor T into a nest 61 with the leads of the transistor extending forwardly through a slot 62 in a retainer 63. As shown in FIG. 5, the pusher bar 53 has completed its movement to the left, and is now proceeding to the right, which is its retracted position.

*The Comber and Feeder*

The comber and feeder, designated 60, may be seen in FIG. 2 to comprise a feed bolt 65 and a comb carriage 85, these two elements being driven by the followers 28 and 29 from the cylindrical cams 41 and 40, respectively.

Figure 8:
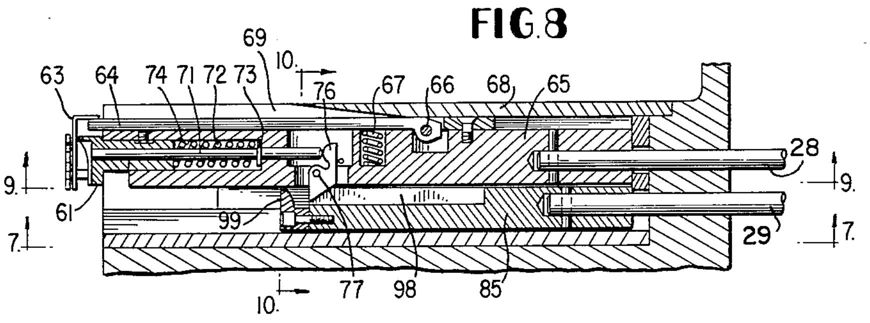
FIG. 8 is a cross-sectional view taken on the line 8—8 of FIG. 7.
Figure 11:
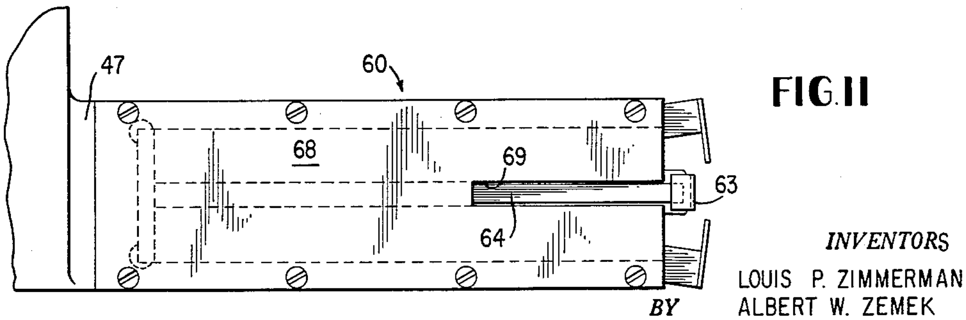
FIG. 11 is an elevational view of the lead comber of the invention, taken on the opposite side thereof from FIG. 1.

The feed bolt 65 carries the nest 61 at its forward or left end, and also carries, as shown on FIG. 8, the retainer arm 64. Retainer arm 64 is pivoted to feed bolt 65 by a pin 66, and carries at its forward end the retainer 63. A spring 67 carried in the feed bolt 65 urges the retainer arm 64 outwardly, or in a clockwise direction as shown in FIG. 8. The housing 47 of the comber and feeder mechanism 60 has a plate 68 with a slot 69 therein, as is shown also in FIG. 11, where the retainer arm 64 may be seen through the said slot 69.

Figure 7:
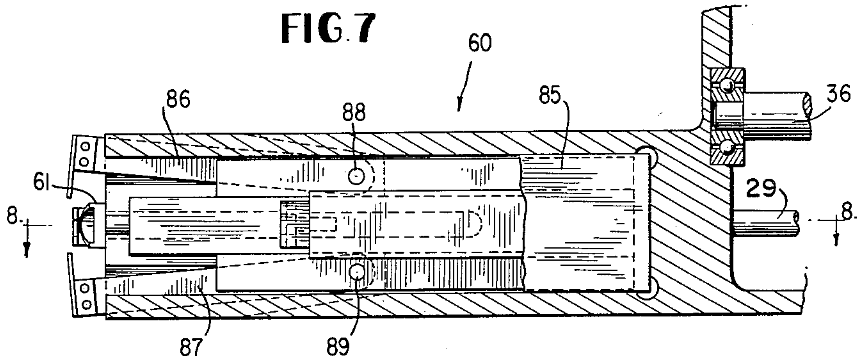
FIG. 7 is a cross-sectional view taken on the line 7—7 of FIG. 2.

The nest 61 is concave at its forward end, as is best shown in FIGS. 7 and 8, and has a generally axially extending bore in which is an injector 71 in the form of a rod. Ejector 71 is urged to its right hand or retracted position, which is shown in FIG. 8, by a spring 72 which abuts against a plate 73 on the ejector 71. The ejector 71 and spring 72 are in a bore 74 in feed bolt 65, and the ejector 71 may be actuated by a lever 76 which is pivotally supported by a pin 77 in feed bolt 65, one end of lever 76 abutting against an end of ejector 71 and the other end extending outwardly of feed bolt 65.

Figure 9:
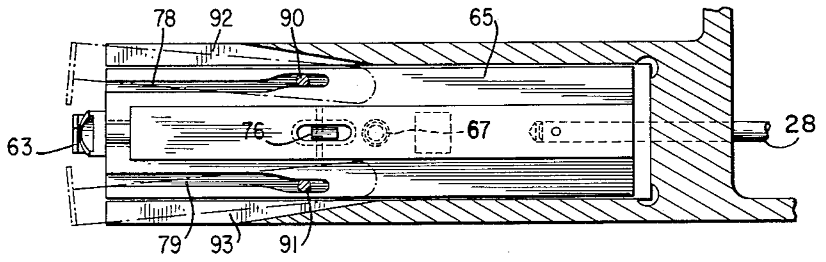
FIG. 9 is a cross-sectional view taken on the line 9—9 of FIG. 8.

Referring now to FIG. 9, there are provided in the feed bolt 65 a pair of non-linear trackways 78 and 79, these controlling the movement of the comb arms, in a manner to be described below.

The comb carriage 85, as shown in FIG. 7, is movable longitudinally, and carries a pair of opposed comb arms 86 and 87, these comb arms being pivotally secured to comb carriage 85 by the pins 88 and 89, respectively. A follower pin 90 is carried by the comb arm 86, and is shown in FIG. 2, and a similar follower pin 91 is carried by the comb arm 87, both of these pins being shown in cross-section in FIG. 9. Follower pin 90 extends into the trackway 78 of the feed bolt 65 and follower pin 91 extends into trackway 79 thereof. As will be understood, relative movement of feed bolt 65 and comb carriage 85 will cause the comb arms 86 and 87 to swing open or closed, as determined by the follower pins 90 and 91 in the trackways 78 and 79. This swinging movement of the comb arms 86 and 87 is permitted by slots 92 and 93 in the housing 47.

Figure 10:
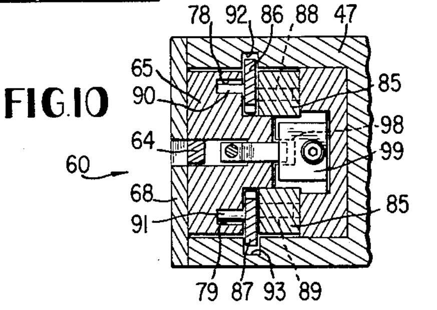
FIG. 10 is a cross-sectional view taken on the line 10—10 of FIG. 8.

In FIG. 10, the comber and feeder 60 is further shown, and there may be seen the comb arms 86 and 87 with their follower pins 90 and 91 extending into the trackways 78 and 79, with the pivots pins 88 and 89 in the comb carriage 85.

Figure 6:
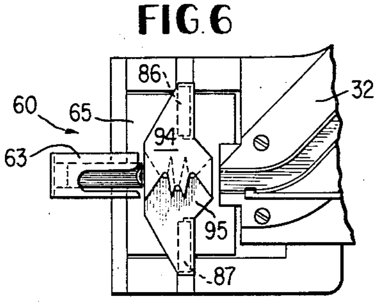
FIG. 6 is an elevational view of a part of the mechanism as shown in FIG. 4, showing the parts in a different position thereof.

As is best seen in FIGS. 4 and 6, the comb arm 86 carries at its forward end a comb 94 having three recesses 96 between the teeth thereof and the comb arm 87 carries a comb 95 which also has three recesses 97 between the teeth thereof. The open position of the comb arms 86 and 87 is shown in FIG. 4 and the closed or overlapped position is shown in FIG. 6, this being the position in which the leads of the transistor T are shown extending through the recesses 96 and 97 and being gripped by the combs 94 and 95.

In FIGS. 8 and 10, the outer end of the lever 76 may be seen to extend into a slot 98 in comb carriage 85, at the forward end of which there is a trip 99, this being carried by comb carriage 85.

Figure 12:
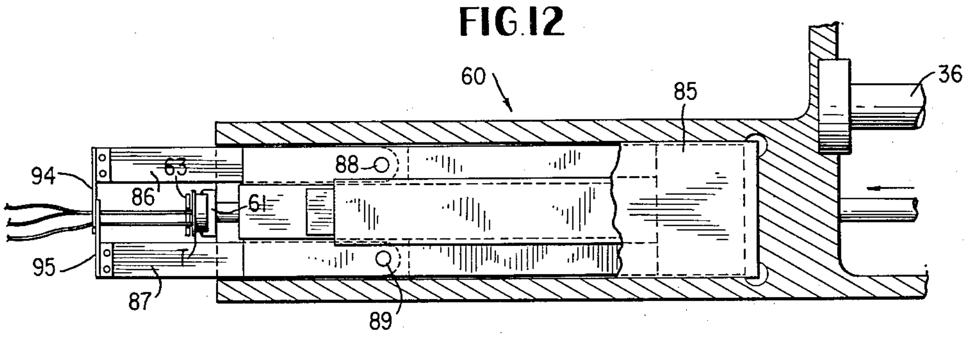
FIG. 12 is a cross-sectional view similar to FIG. 7, showing the parts after an initial movement thereof.
Figure 13:
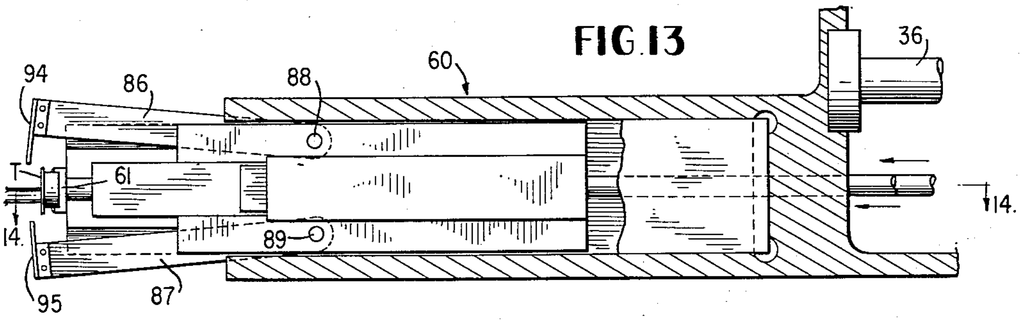
FIG. 13 is a cross-sectional view similar to FIG. 12, and showing the parts after still further movement thereof.
Figure 14:
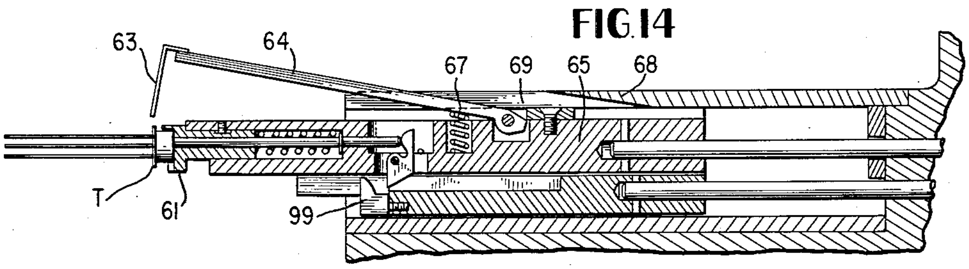
FIG. 14 is a cross-sectional view taken on the line 14—14 of FIG. 13.
Figure 15:
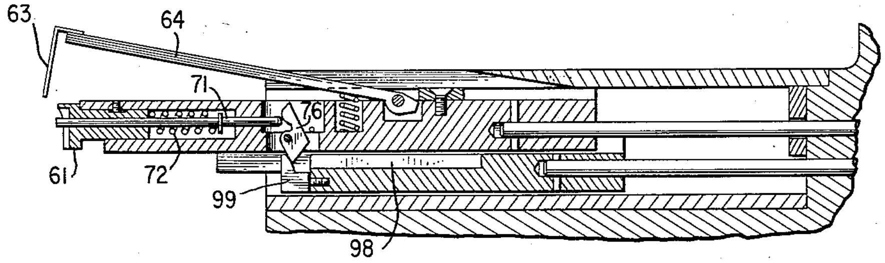
FIG. 15 is a view similar to FIG. 14, and showing the parts after further movement.

The operation will be understood by reference to FIGS. 12 to 15 primarily, considered in conjunction with the foregoing description. In FIG. 12, the transistor T is shown with its head seated in nest 61 and with the leads thereof grasped by the combs 94 and 95. The comb arms 86 and 87, carrying the combs 94 and 95, are moving to the left as viewed in FIG. 12, the retainer 63 holding the head of transistor T in place in nest 61. The comb arms 86 and 87 are being driven forward as the comb carriage 85 to which they are connected is being moved by follower 29 and its driving cam 40. The driving cam 41 of follower 28 is also, at this time, causing the feed bolt 65 to move to the left, but at a much slower rate. This action continues until the entire length of the leads of the transistor T has been acted on by the combs 94 and 95. The combs 94 and 95 are at the ends of the leads at the highest rise of cam 40, and due to a dwell on the cam 40, the comb arms 86 and 87 and combs 94 and 95 are maintained in their most forward, or leftmost, position. The feed bolt 65 then continues its movement, and because of the engagement of pins 90 and 91 in the trackways 78 and 79 on the feed bolt 65, the comb arms 86 and 87 are swung open as is shown in FIG. 13, the feed bolt 65 continuing to move the nest 61 and the transistor T carried thereby to the left and through the plane formerly occupied by the combs 94 and 95. Continued movement of the feed bolt 65 moves the retainer arm 64 past the end of slot 69 in plate 68, thereby permitting the spring 67 to move retainer arm 64 to the outward position shown in FIG. 14. At this instant, the only engagement of the transistor T with any part of the mechanism is the seating of the head of the transistor T in the nest 61. Immediately after the movement of retainer arm 64 to the position shown in FIG. 14, the outstanding arm of lever 76 engages the trip 99, the lever 76 thereby pivoting and the inner end thereof striking the ejector 71. This causes ejector 71 to move to the left, against spring 72, as is shown in FIG. 15, to thereby eject the transistor T out of the nest 61.

Following the ejecting of the transistor, continued rotation of the shaft 36 causes the parts to return to the initial or rest position.

The operation of the feed lever has been described above, it being noted, however, that when the feed lever 44 completes its travel to move the pusher bar 53 to place a transistor in the nest 61, the switch 50 will be closed to thereby complete a circuit to permit the next cycle of the apparatus, failure of the switch 50 to close, as would be occasioned by a jam in the machine, would stop the apparatus by opening the circuit to the motor 33. Also, switch 45 is a motor control switch which must be periodically actuated to permit the continued energization of motor 33.

*Supplementary Guide*

To provide positive guidance of the leads after the combs are opened, a supplementary guide attachment may be provided.

In the embodiment of the invention shown in FIGS. 16 to 19 there is provided a comber and feeder 60 to which is attached a supplementary guide 170, comprising a pair of arms 171 and 172 carrying at their outer ends supplementary guide blocks 173 and 174. Three parallel and mating grooves 175 and 176 are provided in each of the blocks 173 and 174, as may be seen in FIG. 17. These grooves are in alignment with the recesses in the combs 94 and 95. The arms 71 has a cam 177 thereon, and the arm 172 has a similar cam 178. These cams are positioned in the path of movement of the feed bolt 65.

Figure 16:
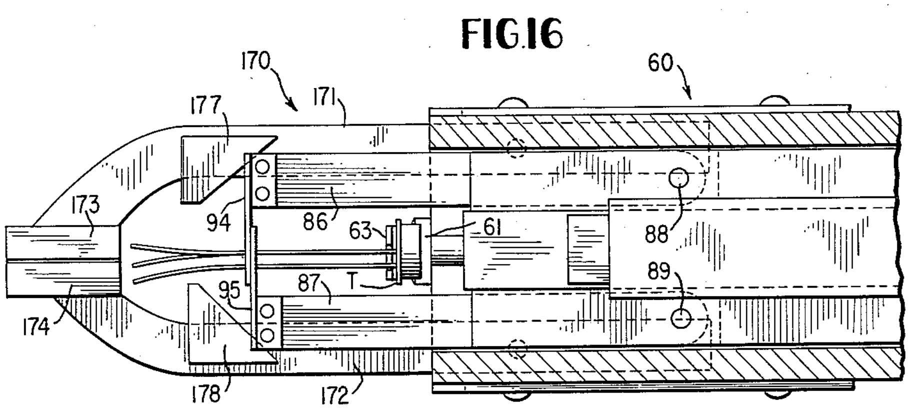
FIG. 16 is a side elevational view showing a supplementary guide attached to a lead comber and feeder.
Figures 17, 18:
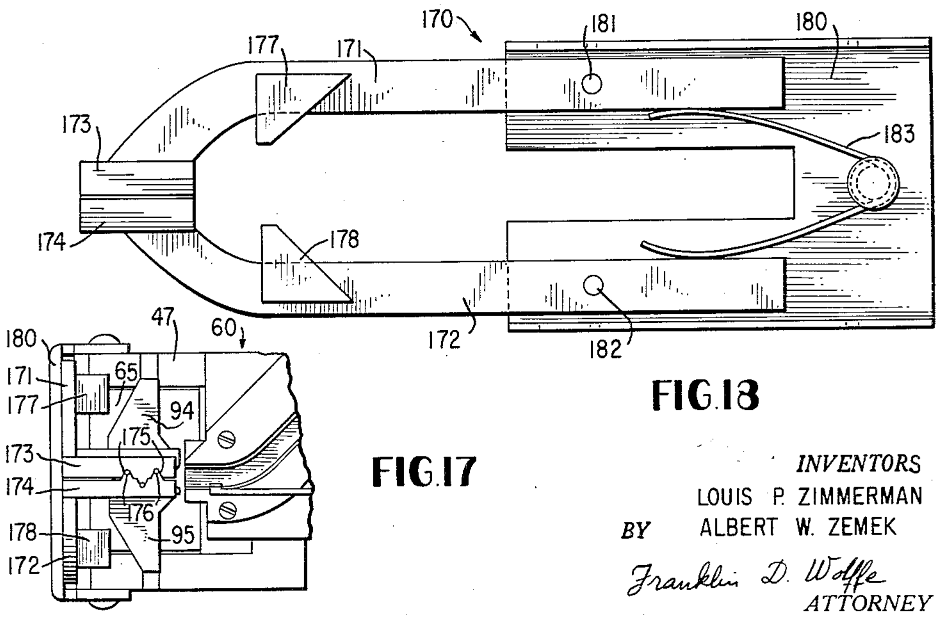
FIG. 17 is a front elevational view thereof.
FIG. 18 is an elevational view of the supplementary guide per se.

The supplementary guide 170 is shown in FIG. 18 to comprise a support bracket 180 to which the arms 171 and 172 are attached by pivots 181 and 182. The arms 171 and 172 have extending ends which are engaged by a spring 183 that acts upon them to urge the guide blocks 173 and 174 to their closed position, as shown in FIGS. 16, 17 and 18. The support bracket is provided with suitable holes to permit its attachment to the housing 47 of comber and feeder 60, and is shaped so as to avoid interfering with the outward swinging movement of retainer arm 64.

Figure 19:
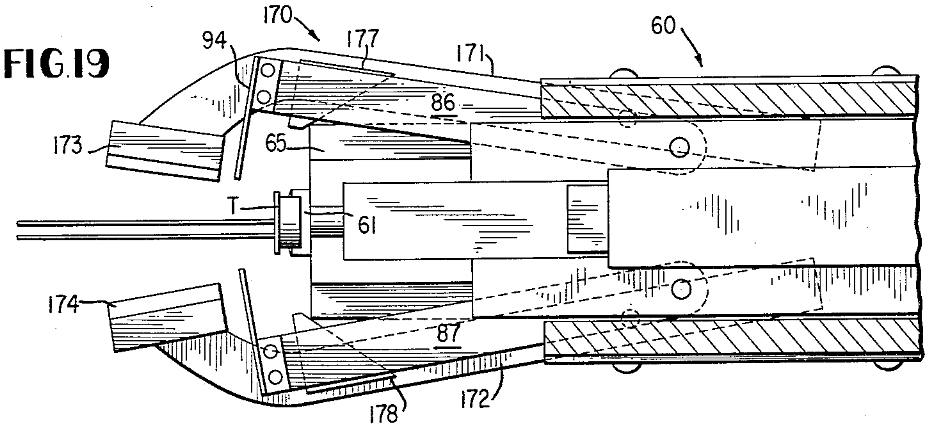
FIG. 19 is a view similar to FIG. 16, but showing the parts in a different position.

In operation, the feed bolt 65 will move to the left, thereby opening the comb arms 86 and 87. The nest 61 will carry the head of transistor T so that the transistor T moves to the left, thus inserting the lead wires into the holes in supplementary guide blocks 173 and 174 as provided by the grooves 175 and 176. This provides for positive guidance of the lead wires as the entire transistor T advances, and after release of the leads by the combs 94 and 95. As the head of transistor T approaches the guide blocks 173 and 174, feed bolt 65 will strike the cams 177 and 178, hereby forcing the arms 171 and 172 open, as shown in FIG. 19, this also opening the guide blocks 173 and 174 to permit passage of the transistor T. Upon retraction of the feed bolt 65, after ejection of the transistor T, the spring 183 will return the arms 171 and 172 to the position shown in FIG. 16.

*Lead Guide and Straightener*

The lead guide and straightener 100 is shown in FIGS. 1 and 20 to 23. The lead guide portion 101 comprises a base plate 102 which is generally perpendicular to the line of movement of the feed bolt 65. Rotatably mounted on the base plate 102 is an annulus 103. Annulus 103 has a center opening 200 and a plurality of concentrically extending slots 104 through which pass the securing screws 106 which are fastened to the base plate 102. An arcuate rack 107 is on the annulus 103, and is in mesh with the pinion 108, driven by a motor 109 (FIG. 1).

Slidably mounted in a guide way 111 in and through base plate 102 is a first guide block 112, guide block 112 having a generally V-shaped lower end with two half-circle holes 113 and 114 in the sides of the V-shaped end thereof. At the apex of the V-shaped end is a one-third circle hole 115. A pin 116 extends from the block 112 through a non-concentric arcuate slot 117 in the annulus 103.

A guide block 118, guided in a guide way 119 in and through base plate 102, and having a pin 121 extending through a non-concentric arcuate slot 122 in annulus 103, has a beveled end with a half-circle opening 123 and a one-third circle opening 125. A third guide block 126 is also movable in the guideway 119, which is perpendicular to guideway 111, and has a half-circle opening 124 and a one-third-circle opening 135; the block 126 has a pin 127 which extends through a non-concentric arcuate slot 128 in annulus 103. The opening 200 in annulus 103 is in alignment with the intersection of the guideways 111 and 119.

A receiver chute 130 having a rack 131 on the side thereof in mesh with a pinion 132 driven by a motor 133 is mounted for movement on the base plate 102, receiver chute 130 having an open-sided slot extending longitudinally thereof which is open at its upper and lower ends. Alternatively, the receiver chute 130 may be actuated by a pin and non-concentric slot construction similar to that shown for moving the guide blocks 112, 118 and 126.

On the opposite side of the guide 101 from the comber and feeder 60 is a die block mechanism generally designated 140 and comprising a support 141 (see FIGS. 1 and 22) having guides 142 and 143 for support blocks 144 and 146, which have therein die blocks 147 and 148. The support blocks 144 and 146 are connected by pins 149 and 151, these pins extending from the block 144 and into appropriate holes in block 146. A relatively weak spring (not shown) tends to keep the support blocks 144 and 146 apart, as well as the die blocks 147 and 148. As may be seen in FIG. 1, a rack 152 extends along the side of support block 144 and has engaged with it a pinion 153 driven by a motor 154. A hammer 155 is carried by a force mechanism, as a hydraulic ram (not shown), above the support blocks 144 and 146 when these blocks are in position immediately behind the guide 101.

Figures 20, 21, 22, 23:
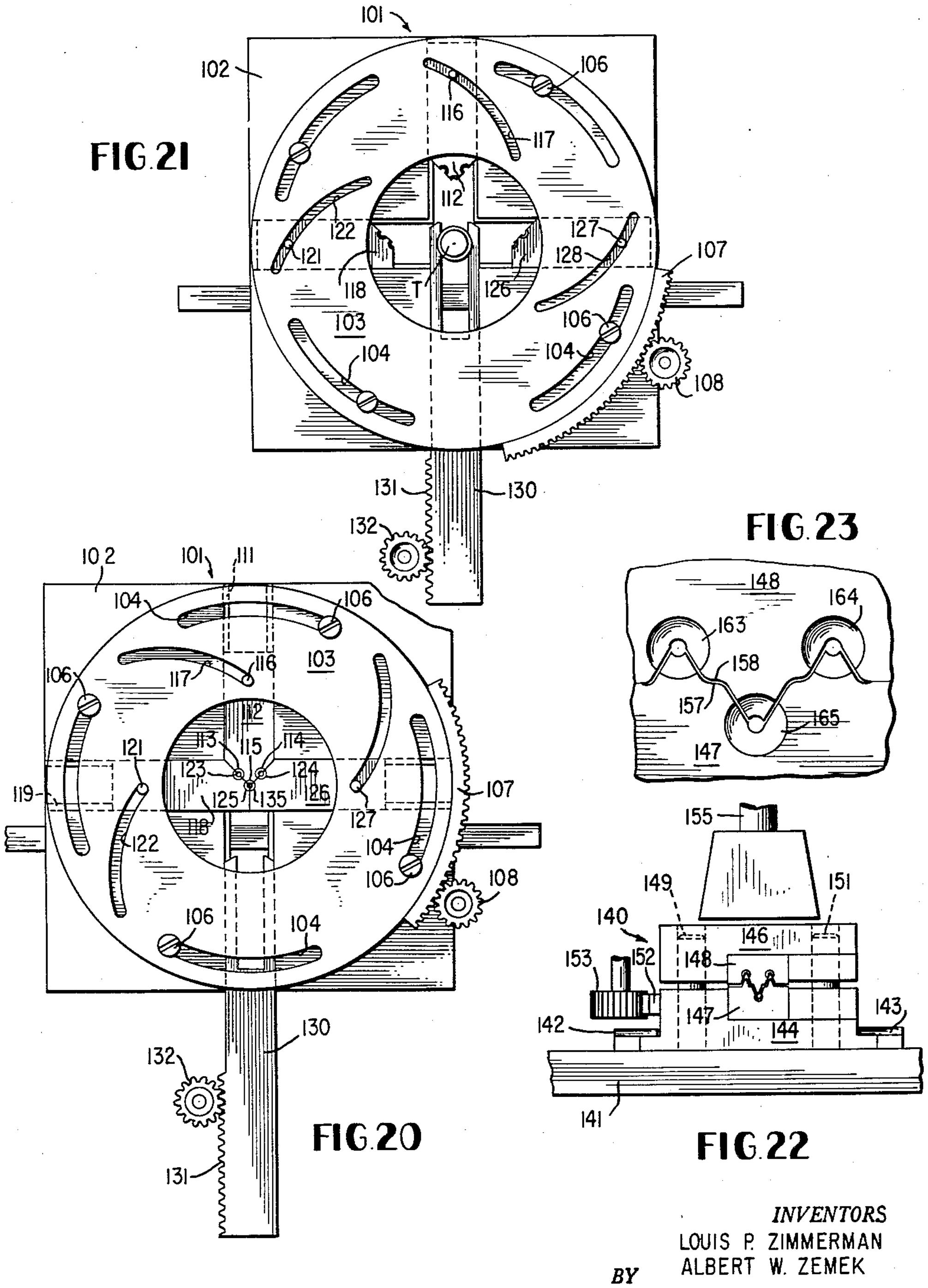
FIG. 20 is an elevational view of the lead guide and straightener, taken on line 20—20 of FIG. 1.
FIG. 21 is a view similar to FIG. 16, but showing the parts in a different position thereof.
FIG. 22 is an elevational view of the die block of the lead straightener.
FIG. 23 is an enlarged view of the die block shown in FIG. 22.

The die blocks 147 and 148 are shown in partial, enlarged view in FIG. 23 and may be seen to have mating, undulating surfaces 157 and 158 with mating, part-circular holes extending therethrough, the composite holes being designated 163, 164 and 165 and having enlarged conical entrance portions. The composite holes 163, 164 and 165 are in alignment with the holes formed in guide blocks 112, 118 and 126.

In operation, the leads of a transistor will be moved towards the guide 101, with their ends generally aligned with the composite openings provided by the part-openings previously described in the guide blocks 112, 118 and 126. The leads of the transistor will be guided into these composite openings by the enlarged ends thereof, and then will pass through these openings and into the corresponding and aligned composite-openings 163, 164 and 165 of the die blocks 147 and 148, these die blocks being in the position shown in FIG. 1. As the transistor head approaches the guide 101, an appropriate switch (not shown) will energize motor 109 to cause rotation of annulus 103 through arcuate rack 107 and pinion 108. Annulus 103 will thus rotate, guided by slots 104 and screws 106, and will thereby cause the withdrawal of the blocks 112, 118 and 126 to the positions shown in FIG. 21 due to the engagement of the pins 116, 121 and 127 with the non-concentric slots 117, 122 and 128, respectively. After the transistor leads and the transistor head have passed through the plane of annulus 103 and base plate 102, the leads will be held in the die blocks 147 and 148, and the hammer 155 will be caused to give the upper die block 148 a sharp blow, which will straighten the leads of the transistor. While the leads are thus being straightened, the motor 133 will be energized to drive the receiver chute 130 upwardly from the position shown in FIG. 20 to that shown in FIG. 21, and the upper end of the receiver chute 130 will generally encompass the head of the transistor T. Thereafter, the motor 154 will be energized to retract the supports 144 and 146, with die blocks 147 and 148, to the left as shown in FIG. 1, thereby releasing the leads of the transistor, and permitting the transistor to descend by gravity, with its head in the receiver chute 130. Thereafter, the parts will return to the position shown in FIGS. 1 and 20.

There has been provided a lead comber and straightener, with a guide and a supplementary guide. These devices will rapidly comb the leads of a transistor, and straighten them, the operations being automatically effected. They are entirely dependable in operation.

It will be obvious to those skilled in the art that various changes may be made without departing from the spirit of the invention and therefore the invention is not limited to what is shown in the drawings and described in the specification but only as indicated in the appended claims.

What is claimed is:

1. In apparatus for handling components comprising a body with leads extending therefrom, means for holding a component body, means for supplying components to said holding means, means for gripping the leads of the component between the body and the free ends of the leads, means for increasing the distance between the gripping means and the holding means to thereby straighten the leads, means for moving the holding means so that the body and leads move generally along the line of the leads, means for removing said gripping means from the path of movement of the body as the body approaches the gripping means, pressing die means for receiving the leads as the leads are moved with the holding means, means intermediate said pressing die means and said holding means for guiding the leads during movement thereof, means for removing said guiding means from the path of movement of the body as the body approaches the guiding means, means for releasing the body from the holding means, means for actuating the pressing die means, means for receiving the body while the leads are in the pressing die means, and means for relatively moving the pressing die means and the receiving means to thereby remove the leads from the pressing die means.

2. The apparatus of claim 1, and auxiliary guide means between said guiding means and said holding means for guiding said leads.

3. In apparatus for handling components comprising a body with leads extending therefrom, means for holding a component body, means for gripping the leads of the component between the body and the free ends of the leads, means for increasing the distance between the gripping means and the holding means to thereby straighten the leads, means for moving the holding means so that the body and leads move generally along the line of the leads, means for removing said gripping means from the path of movement of the body as the body approaches the gripping means, pressing die means for receiving the leads as the leads are moved with the holding means, means for releasing the body from the holding means, means for actuating the pressing die means, means for receiving the body while the leads are in the pressing die means, and means for relatively moving the pressing die means and the receiving means to thereby remove the leads from the pressing die means.

4. In apparatus for handling components comprising a body with leads extending therefrom, means for holding a component body, means for gripping the leads of the component between the body and the free ends of the leads, means for increasing the distance between the gripping means and the holding means to thereby straighten the leads, means for moving the holding means so that the body and leads move generally along the line of the leads, means for removing said gripping means from the path of movement of the body as the body approaches the gripping means, pressing die means for receiving the leads as the leads are moved with the holding means, means for releasing the body from the holding means, and means for actuating the pressing die means.

5. In apparatus for handling components comprising a body with leads extending therefrom, means for holding a component body, means for gripping the leads of the component between the body and the free ends of the leads, means for increasing the distance between the gripping means and the holding means to thereby straighten the leads, means for moving the holding means so that the body and leads move generally along the line of the leads, means for removing said gripping means from the path of movement of the body as the body approaches the gripping means, means for guiding the leads during movement thereof, means for removing said guiding means from the path of movement of the body as the body approaches the guiding means, and means for releasing the body from the holding means.

6. In apparatus for handling components comprising a body with leads extending therefrom, means for holding a component body, means for moving the holding means so that the body and leads move generally along the line of the leads and toward a gripping means, means for guiding the leads during movement thereof, and means for removing said guiding means from the path of movement of the body as the body approaches the guiding means.

7. A lead comber comprising a housing, a feed bolt slidable in said housing and having at its forward end a nest for receiving the body of a transistor, means for reciprocating said feed bolt, a retainer arm pivotally connected to said feed bolt and having a retainer at its free end in juxtaposition with said nest, means for pivoting said retainer arm to withdraw said retainer after a predetermined forward movement of said feed bolt, an ejector in said feed bolt and extending into said nest, means for moving said ejector to eject a transistor from said nest at the forward end of the feed bolt travel, a comb carriage slidable in said housing, means for reciprocating said comb carriage, a pair of opposed comb arms pivotally secured to said comb carriage, each said comb arm carrying at its forward end a comb, said combs overlapping forwardly of said nest in the closed position thereof, said comb arms having followers extending therefrom into trackway means in said feed bolt for causing said combs to overlap in advance of said nest to thereby separate and comb the leads of a transistor in said nest upon initial forward movement of said comb carriage and for causing said comb elements to open after a predetermined forward movement of said feed bolt.

8. A lead comber comprising a housing, a feed bolt slidable in said housing and having at its forward end a nest for receiving the body of a transistor, means for reciprocating said feed bolt, an ejector in said feed bolt and extending into said nest, means for moving said ejector to eject a transistor from said nest at the forward end of the feed bolt travel, a comb carriage slidable in said housing, means for reciprocating said comb carriage, a pair of opposed comb arms pivotally secured to said comb carriage, each said comb arm carrying at its forward end a comb, said combs overlapping forwardly of said nest in the closed position thereof, said comb arms having followers extending therefrom into trackway means in said feed bolt for causing said combs to overlap in advance of said nest to thereby separate and comb the leads of a transistor in said nest upon initial forward movement of said comb carriage and for causing said comb elements to open after a predetermined forward movement of said feed bolt.

9. A lead comber comprising a housing, a feed bolt slidable in said housing and having at its forward end a nest for receiving the body of a transistor, means for reciprocating said feed bolt, an ejector rod in said feed bolt and extending into said nest, a lever carried by said feed bolt for moving said ejector rod to eject a transistor from said nest, trip means in said housing for engagement with said lever at the forward end of the feed bolt travel, a comb carriage slidable in said housing, means for reciprocating said comb carriage, a pair of opposed comb arms pivotally secured to said comb carriage, each said comb arm carrying at its forward end a comb, said combs overlapping forwardly of said nest in the closed position thereof, and means for causing said combs to overlap in advance of said nest to thereby separate and comb the leads of a transistor in said nest upon initial forward movement of said comb carriage and to open after a predetermined forward movement of said feed bolt.

10. A lead comber comprising a housing, a feed bolt slidable in said housing and having at its forward end a nest for receiving the body of a transistor, means for reciprocating said feed bolt, a retainer arm pivotally connected to said feed bolt and having a retainer at its free end in juxtaposition with said nest, means for pivoting said retainer arm to withdraw said retainer after a predetermined forward movement of said feed bolt, a comb carriage slidable in said housing, means for reciprocating said comb carriage, a pair of opposed comb arms pivotally secured to said comb carriage, each said comb arm carrying at its forward end a comb, said combs overlapping forwardly of said nest in the closed position thereof, said comb arms having followers extending therefrom into trackway means in said feed bolt for causing said combs to overlap in advance of said nest to thereby separate and comb the leads of a transistor in said nest upon initial forward movement of said comb carriage and for causing said comb elements to open after a predetermined forward movement of said feed bolt.

11. A lead comber comprising a housing, a feed bolt slidable in said housing and having at its forward end a nest for receiving the body of a transistor, means for reciprocating said feed bolt, a retainer arm pivotally connected to said feed bolt and having a retainer at its free end in juxtaposition with said nest, spring means carried by said feed bolt for urging said retainer away from said feed bolt to withdraw said retainer, means on said housing for permitting pivoting of said retainer arm only after a predetermined forward movement of said feed bolt, a comb carriage slidable in said housing, means for reciprocating said comb carriage, a pair of opposed comb arms pivotally secured to said comb carriage, each said comb arm carrying at its forward end a comb, said combs overlapping forwardly of said nest in the closed position thereof, and means for causing said combs to overlap in advance of said nest to thereby separate and comb the leads of a transistor in said nest upon initial forward movement of said comb carriage and to open after a predetermined forward movement of said feed bolt substantially less than the full forward movement.

12. A lead comber comprising a housing, a feed bolt slidable in said housing and having at its forward end a nest for receiving the body of a transistor, means for receiprocating said feed bolt, a comb carriage slidable in said housing, means for reciprocating said comb carriage, a pair of opposed comb arms pivotally secured to said comb carriage, each said comb arm carrying at its forward end a comb, said combs overlapping forwardly of said nest in the closed position thereof, said comb arms having followers extending therefrom into trackway means in said feed bolt for causing said combs to overlap in advance of said nest to thereby separate and comb the leads of a transistor in said nest upon initial forward movement of said comb carriage and for causing said comb elements to open after a predetermined forward movement of said feed bolt.

13. A lead comber comprising a housing, a feed bolt slidable in said housing and having at its forward end a nest for receiving the body of a transistor, means for reciprocating said feed bolt, a comb carriage slidable in said housing, means for reciprocating said comb carriage, a pair of opposed comb arms pivotally secured to said comb carriage, each said comb arm carrying at its forward end a comb, said combs overlapping forwardly of said nest in the closed position thereof, and means for causing said combs to overlap in advance of said nest to thereby separate and comb the leads of a transistor in said nest upon initial forward movement of said comb carriage and to open after a predetermined forward movement of said feed bolt.

14. In an apparatus for handling components, each component comprising a body with a plurality of leads extending from one face of the body; means for holding the component body, means for moving the holding means so that the body and leads move generally along the axial line of the leads, pressing die means for receiving and maintaining the leads of the components as said leads are moved into the pressing die means by the holding means, means for releasing the body of the component from the holding means when the leads are sufficiently maintained by said pressing die means and means for actuating the pressing die means to sharply rap the leads simultaneously after the release of the holding means.

References Cited in the file of this patent

UNITED STATES PATENTS

| | | |
|---|---|---|
| 1,853,947 | Poel | Apr. 12, 1932 |
| 2,337,055 | Mathias | Dec. 21, 1943 |
| 2,993,516 | Davidson | July 25, 1961 |
| 3,004,565 | Hanson | Oct. 17, 1961 |
| 3,013,590 | Pechy | Dec. 19, 1961 |
| 3,020,936 | Bracci | Feb. 13, 1962 |
| 3,028,886 | Drukker | Apr. 10, 1962 |
| 3,075,562 | Jankowski | Jan. 29, 1963 |